J. J. KOCHER

SOUND DEADENING DEVICE

Aug. 23, 1932.

Re. 18,573

Original Filed Nov. 12, 1928

Witnesses

Arthur M. Franke.
Robert E. Harris

Inventor.
Jacques J. Kocher
By Rummler & Rummler
Attys:

Reissued Aug. 23, 1932 Re. 18,573

UNITED STATES PATENT OFFICE

JACQUES JEAN KOCHER, OF CHICAGO, ILLINOIS

SOUND DEADENING DEVICE

Original No. 1,745,171, dated January 28, 1930, Serial No. 318,789, filed November 12, 1928. Application for reissue filed October 3, 1930. Serial No. 486,258.

This invention relates to a sound deadening device, particularly for floor construction.

The main objects of this invention are to provide an improved sound deadening device for use in floor construction which may be conveniently and completely manufactured to avoid assembly on the job, to provide attaching means which may be conveniently mounted on a strip of vibration insulating material such as felt, and permanently secured thereto before installation in that position in which it is ultimately used in a floor construction, and to provide integral clips on a device of the class described formed to allow insertion through slits in a felt member and to prevent separation of the latter from the device.

Another object of my invention is to provide means for confining a sound deadening member in a fixed location between the superimposed layers of flooring in such a manner as to minimize the amount of rigid connection between said layers.

In the accompanying drawing I have shown an embodiment of my invention in which.

In general, my invention embodies an improved sound vibration insulating means comprising a strip of felt having improved straps permanently mounted thereon, for installation between a finish layer and a furring strip of a floor. The attaching member comprises a strap having opposite feet portions substantially in the same plane, and a top section in a spaced, substantially parallel plane. The feet and top sections are connected by inclined side portions. Clips integral at one end with the top section are cut out of the latter and bent downwardly substantially perpendicular to the top section. The free end portions of the clips are formed to provide a flange which is substantially parallel to the top section.

Figure 3:
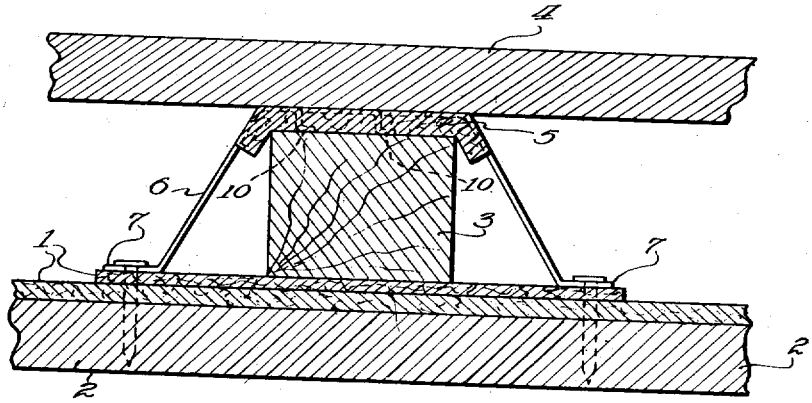
Fig. 3 is a section of a floor construction embodying my invention.

In the form shown in the drawing, sound resisting layers 1, preferably comprising felt, are located between a rough layer of the floor 2 and a furring strip 3 supported thereon. The finish or top layer 4 of the floor is supported in turn by the furring strip 3 as shown in Fig. 3.

My improved sound deadening means comprising a felt strip 5, is located between the top layer 4 of the floor and the furring strip 3 and is firmly clamped on the top of the furring strip by a strap 6. The strap 6 is provided with feet portions 7 which engage the upper surface of the felt member 1, and thus avoid a direct rigid connection between the upper and lower layers of the floor.

During the construction of a floor such as is shown in the drawing, it is desirable to have all the elements required, arrive on the scene of construction in as complete a condition as possible in order that time and labor may be saved on the job. For this reason it has been found practical to permanently and securely attach the straps 6 to the felt strip 5 at the factory or plant where the materials are prepared for assembling. The strips 5 may be made of any desired length and cut to fit the size of the floor under construction, either before delivery to the scene of construction, or thereafter.

Figure 1:
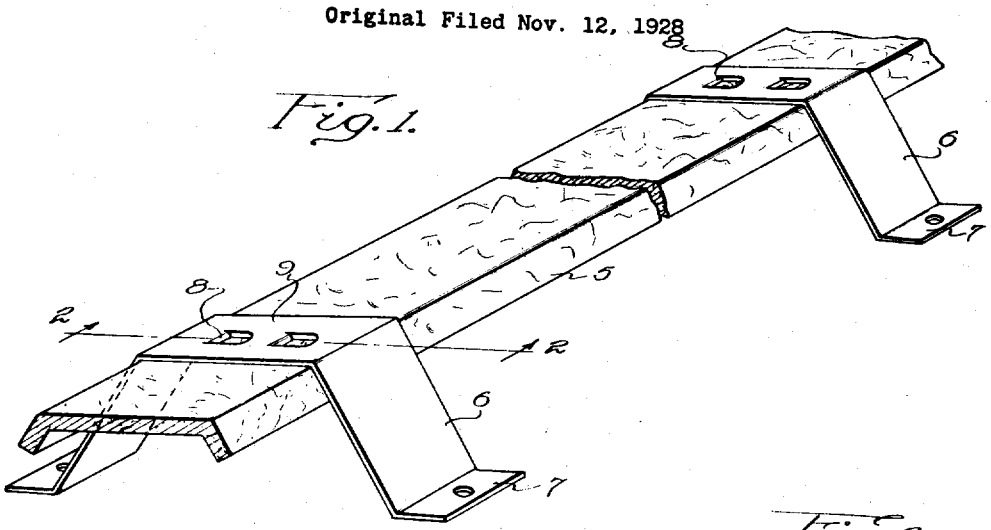
Fig. 1 is a fragmentary perspective of a completed sound deadening element.
Figure 2:
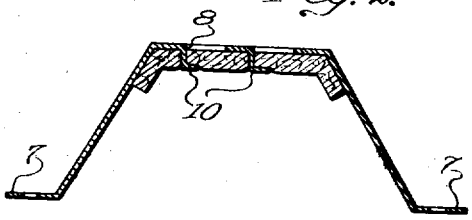
Fig. 2 is a transverse section taken on the line 2—2 of Fig. 1.

Clips 8 are formed on the top section 9 of the straps by cutting out spaced portions thereof and bending the same downwardly as shown in Fig. 1, allowing one edge of the clip to remain integral with the top section 9. The bottom portions of the clips are provided with the flange 10 which is substantially parallel to the top sections 9, as shown in Fig. 2.

The straps may be conveniently secured to the felt strip 5 by inserting the clips 7 through slits in the felt member so as to engage the flange 10 against the lower surface of the felt member as viewed in the drawing. Any desired number of straps may be similarly mounted on the felt member and when the latter is positioned over a furring strip, the straps together with the felt member may be held permanently in place by driving nails through apertures in the feet of the strap and through the felt layer or layers 1 into the bottom layer of the floor 2.

It will be observed that when the straps 6 are anchored in tension to the sub-floor 2 the body of the strap lies in transverse depressions in the felt saddle strip 5, as shown in Fig. 3. Thus the floor is supported by the cushion of felt 5 and not by the anchored straps.

Although but one specific embodiment of this invention has been herein shown and described, it will be understood that details of the construction shown may be altered or omitted without departing from the spirit of this invention as defined by the following claims.

I claim:

1. A floor comprising a rough underfloor, spaced furring strips thereon, a top finish-floor and elongated sound insulating saddles interposed between said finish-floor and strips, said saddles having mutually-spaced bowed perforate-footed downholding straps attached thereto for anchoring tensionally to the underfloor.

2. In a floor construction comprising a rough layer, a finish layer, and furring strips therebetween, a sound resisting element between said rough layer and said furring strips, and vibration insulating means between said finish layer and said furring strips, said insulating means having straps permanently fixed thereto independently of the floor construction, and feet on said straps for tensionally securing the same, together with said sound resisting element to the rough layer of the flooring so as to embed the top part of said strap in said insulating material.

3. In a floor construction having a floor and strip means to support said floor, and a sub-floor to support said strip means, a sound-proofing cushion interposed between said strip means and said floor, said cushion having transverse depressed portions in the upper side thereof, and fastening straps each having ends secured to the sub-floor and an intermediate part spanning a cushioned strip and lying in a depressed portion.

4. A floor comprising a rough underfloor, spaced furring strips thereon, a top finish-floor and elongated sound insulating saddles interposed between said finish-floor and strips, said saddles having mutually-spaced bowed perforate-footed downholding straps secured to the rough floor and sunk into said saddles for anchoring tensionally to the underfloor.

5. In a floor construction comprising a rough layer, a finish layer, and furring strips therebetween, a sound resisting element between said rough layer and said furring strips, and vibration insulating means between said finish layer and said furring strips, said insulating means having spanning straps with feet on said straps secured to said rough-floor for tensionally securing said straps and said insulating means together with said sound resisting element to the rough layer of the flooring so as to embed the top part of said strap in said insulating means.

In testimony whereof I have hereto affixed my signature.

JACQUES JEAN KOCHER.